United States Patent
Helsel et al.

(10) Patent No.: US 6,419,534 B1
(45) Date of Patent: Jul. 16, 2002

(54) STRUCTURAL SUPPORT SYSTEM FOR AN OUTBOARD MOTOR

(75) Inventors: Rock J. Helsel, Campbellsport; Martin E. Olson Gunderson, Green Bay, both of WI (US); Stephen E. Polakowski, Houghton, MI (US)

(73) Assignee: Brunswick Corporation, Lake Forest, IL (US)

( * ) Notice: Subject to any disclaimer, the term of this patent is extended or adjusted under 35 U.S.C. 154(b) by 0 days.

(21) Appl. No.: 09/880,380

(22) Filed: Jun. 13, 2001

(51) Int. Cl.[7] .................................................. B63H 1/15
(52) U.S. Cl. ......................................... 440/52; 440/900
(58) Field of Search .............................. 440/49, 52, 900

(56) References Cited

U.S. PATENT DOCUMENTS

| | | | |
|---|---|---|---|
| 3,613,631 A | * 10/1971 | Wick et al. | 440/52 |
| 3,934,537 A | 1/1976 | Hall | 115/17 |
| 3,982,496 A | * 9/1976 | Blanchard | 440/52 |
| 4,384,856 A | 5/1983 | Hall et al. | 440/61 |
| 4,395,238 A | 7/1983 | Payne | 440/53 |
| 4,482,332 A | * 11/1984 | Emmons | 114/144 R |
| 4,545,770 A | 10/1985 | Ferguson | 440/61 |
| 4,979,918 A | 12/1990 | Breckenfeld | 440/52 |
| 5,083,949 A | 1/1992 | Breckenfeld et al. | 440/52 |
| 5,192,235 A | 3/1993 | Dunham et al. | 440/52 |
| 5,443,406 A | 8/1995 | Mondek et al. | 440/52 |
| 5,460,552 A | 10/1995 | Blanchard et al. | 440/38 |
| 5,511,997 A | 4/1996 | Yoshida | 440/52 |
| 5,846,106 A | 12/1998 | Kumita | 440/52 |
| 5,964,197 A | 10/1999 | Koishikawa et al. | 123/195 |
| 6,146,220 A | 11/2000 | Alby et al. | 440/53 |

* cited by examiner

*Primary Examiner*—Stephen Avila
(74) *Attorney, Agent, or Firm*—William D. Lanyi

(57) ABSTRACT

A support system is provided for an outboard motor which uses four connectors attached to a support structure and to an engine system for isolating vibration from being transmitted to the marine vessel to which the outboard is attached. Each connector comprises an elastomeric portion for the purpose of isolating the vibration. Furthermore, the four connectors are disposed in a common plane which is generally perpendicular to a central axis of a driveshaft of the outboard motor. Although precise perpendicularity with the driveshaft axis is not required, it has been determined that if the plane extending through the connectors is within forty-five degrees of perpendicularity with the driveshaft axis, improved vibration isolation can be achieved. A support structure, or support saddle, completely surrounds the engine system in the plane of the connectors. All of the support of the outboard motor is provided by the connectors within the plane, with no additional support provided at a lower position on the outboard motor driveshaft housing.

26 Claims, 10 Drawing Sheets

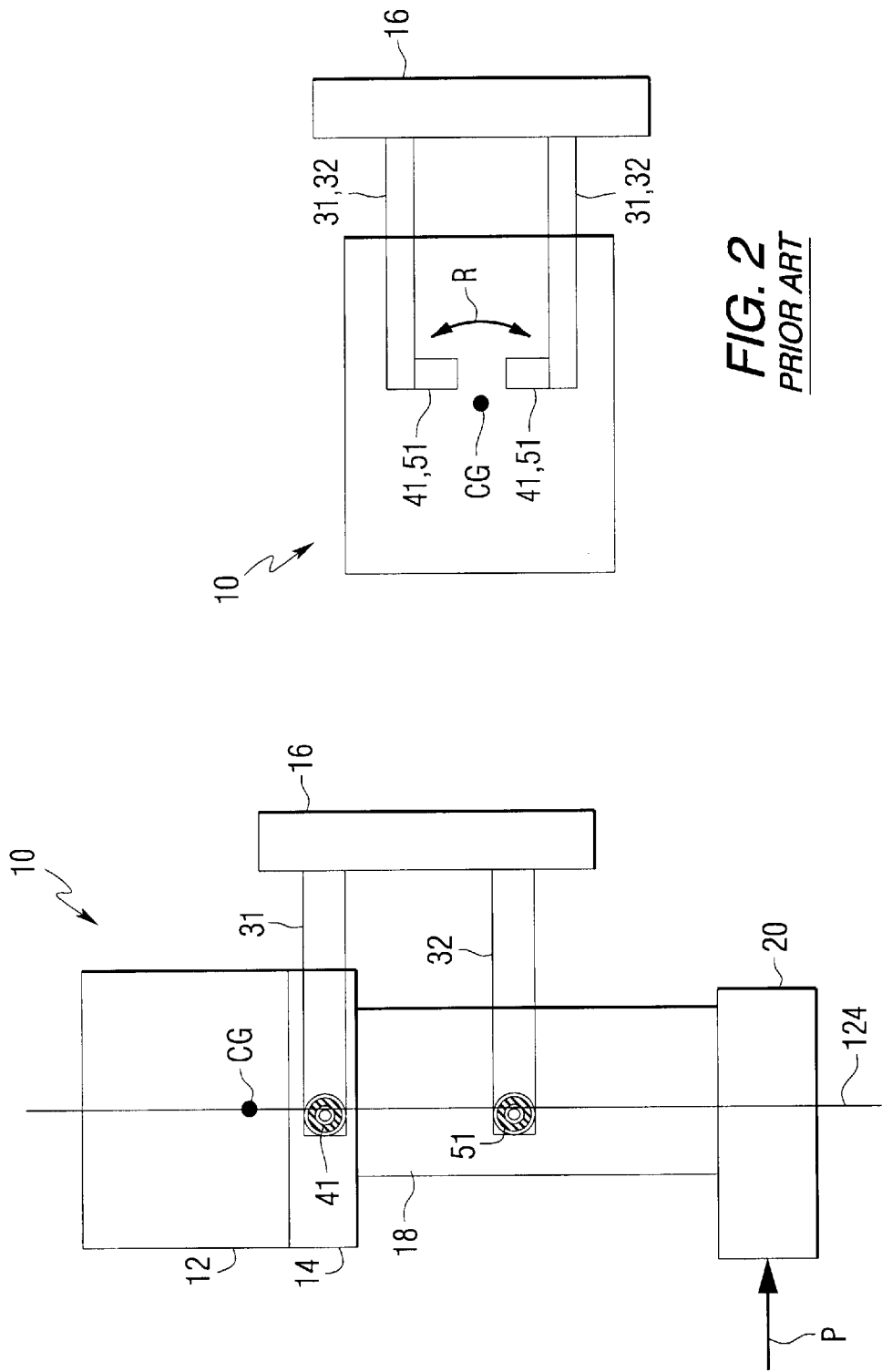

STRUCTURAL SUPPORT SYSTEM FOR AN OUTBOARD MOTOR

BACKGROUND OF THE INVENTION

1. Field of the Invention

The present invention is generally related to a support system for an outboard motor and, more particularly, to a support system that uses a plurality of elastomeric connectors, or mounts, arranged in a common plane of a finite thickness that is generally perpendicular to a driveshaft of the outboard motor.

2. Description of the Prior Art

Many different types of outboard motors are well known to those skilled in the art. All known outboard motor attach to a marine vessel in the region of the transom. Typically, a transom bracket which is attached to the outboard motor can be attached to the transom to allow the outboard motor to rotate about a vertical steering axis and trim or tilt about a horizontal tilt axis. Most support structures incorporate four or more elastomeric connectors that are used to mount the outboard motor to the transom bracket in such a way so as to isolate vibration generated by the outboard motor.

U.S. Pat. No. 5,964,197, which issued to Koishikawa et al on Oct. 12, 1999, describes an outboard motor and engine. The outboard motor body case is supported on a swivel shaft though a connecting member. The swivel shaft is vertically swingable about a tilting axis. An engine is mounted at an upper portion of the outboard motor body case with a crankshaft thereof being oriented vertically and a flywheel is mounted at a lower end of the crankshaft and disposed between an engine block and the connecting member. A dynamo is mounted within the flywheel and a starter motor is engaged with a ring gear which is formed around an outer periphery of the flywheel. Thus, since the flywheel having a large weight is mounted at the lower end of the crankshaft, the position of the center of gravity of the outboard motor is lowered. Therefore, it is possible to easily perform a tilting-up about the tilting shaft with a small force. Moreover, since the flywheel is mounted on a power taking-off side of the crankshaft, the torsional vibration of the crankshaft can be reduced.

U.S. Pat. No. 3,934,537, which issued to Hall on Jan. 27, 1976, describes a vibration isolating mount for an outboard motor. The vibration isolating arrangement for an outboard motor having a propulsion unit mounted rearwardly of the steering axis of the outboard motor includes a powerhead, a driveshaft housing having a driveshaft, and a lower unit carrying a propeller. The mounting arrangement includes an upper mount and a pair of lower mounts secured to the propulsion unit in vertically spaced relation and rearwardly of or behind the driveshaft. The top mount includes a cross bar which has a wedged-shaped cross section with the upper and lower surfaces thereof converging in the direction of propeller thrust, which is supported by a resilient bushing within a casing, and which has outer ends extending from the casing transversely to the direction of propeller thrust for connection to a swivel bracket. The lower mounts are mounted in laterally spaced recesses provided in the driveshaft housing. Each of the lower mounting units includes an insert which has a wedge-shaped cross section with the upper and lower surfaces thereof diverging in the direction of forward propeller thrust and which is supported by a pair of resilient pads disposed between a pair of spacer members which fit snugly into opposed grooves provided in each drive shaft housing recess.

U.S. Pat. No. 4,384,856, which issued to Hall et al on May 24, 1983, describes a lateral support arrangement for an outboard motor with separate tilt and trim axes. The outboard motor comprises a transom bracket adapted to be connected to a boat transom, a propulsion unit which is mounted to the transom bracket for pivotal steering movement of the propulsion unit in a horizontal plane and for pivotal movement of the propulsion unit in a vertical plane between a lowermost running position and a full tilt position, in which the propulsion unit includes a first pivot connecting an intermediate bracket to the transom bracket for pivotal movement of the intermediate bracket relative to the transom bracket about a first pivot axis which is horizontal when the transom bracket is boat mounted, whereby movement of the propulsion unit through a tilt range is enabled. A second pivot connects a swivel bracket to the intermediate bracket for pivotal movement of the swivel bracket with the intermediate bracket and relative to the intermediate bracket about a second pivot axis parallel to the first pivot axis, whereby movement of the propulsion unit through a trim range is enabled. A king pin pivotally connecting the propulsion unit to the swivel bracket for steering movement for steering movement of the propulsion unit relative to the steering bracket about a generally vertical axis and for common pivotal movement with the swivel bracket in a vertical plane about the first and second horizontal axis is provided along with hydraulic cylinders for sequentially displacing the propulsion unit from the lowermost position through the trim range and then through the tilt range to the full tilt position. A support is provided on the transom bracket for providing side support to the intermediate bracket.

U.S. Pat. No. 4,395,238, which issued to Payne on Jul. 26, 1983, describes an outboard motor mounting means affording upward tilting without travel of the motor forward of the boat transom. The marine propulsion device comprises a bracket adapted to be fixed to the transom of a boat and including a generally planar mounting surface engaged with the boat transom when the bracket is boat mounted. The bracket also includes a lower part having a lower bearing with a steering axis which extends generally vertical when the bracket is boat mounted. A member includes a lower portion extending in the lower bearing and a pair of laterally spaced arms connected to the lower portion and respectively including upper horizontal bearings having a common axis located in spaced relation above the lower bearing. It also comprises a steering arm fixed to the member for steerably rotating the member within the lower bearing about the generally vertical axis. The propulsion unit includes a powerhead and a lower unit extending fixedly downwardly from the powerhead and including a rotatably mounted propeller. Trunions on the powerhead adjacent to the top thereof and received in the upper horizontal bearings for pivotally connecting the propulsion unit to the member for movement about the horizontal axis between a running position with the propeller submerged in water and with the propulsion unit located wholly aft of the bracket mounting surface are disclosed. An elevated position with the propeller substantially out of the water and with the propulsion unit located wholly aft of the bracket mounting surface is also described U.S. Pat. No. 4,545,770, which issued to Ferguson on Oct. 8, 1985, described an outboard motor mounting arrangement. A marine propulsion installation comprises a marine propulsion device which includes a transom bracket having a mounting portion fixed to the rear of a boat transom below the upper edge thereof. It also includes a pair of laterally spaced arms extending upwardly from the mounting portion and including respective upper ends located rearwardly of the boat transom and above the upper edge thereof. A swivel bracket comprises a mounting portion and a pair of laterally spaced arms extending upwardly from the swivel bracket mounting portion and including respective upper ends. It also includes a tilt pin connecting the upper ends of the transom bracket and swivel bracket arms to provide for pivotal movement of the swivel bracket relative to the transom bracket upon the tilt axis which is horizontally located rearwardly of the transom and above the upper edge thereof. A propulsion unit includes an internal combustion engine and a propeller mounted for rotation and driven by the engine along with a king pin which connects the propulsion unit to the swivel bracket mounting portion for pivotal steering movement of the propulsion unit relative to the swivel bracket about a second axis transverse to the tilt axis.

U.S. Pat. No. 4,979,918, which issued to Breckenfeld et al on Dec. 25, 1990, describes an outboard motor vibration isolation system. The marine propulsion device comprises a propulsion unit including a cavity defined in part by a wall. It also comprises an opening communicating with the cavity and a rubber mount insertable into the cavity through the opening. Furthermore, it comprises an expandable wedge insertable through the opening and into the cavity. The wedge is securable to the propulsion unit and engageable with the rubber mount for fixedly securing the rubber mount to the propulsion unit and between the insertable expandible wedge and the wall of the cavity.

U.S. Pat. No. 5,083,949, which issued to Breckenfeld et al on Jan. 28, 1992, describes a marine propulsion device with a resilient mounting for a propulsion unit. The marine propulsion device comprises an internal combustion engine including an engine block, a driveshaft housing, a propeller shaft rotatably supported by the driveshaft housing, and adapted to support a propeller. It also comprises a driveshaft extending through the driveshaft housing and including an upper end driven by the engine and a lower end drivingly connected to the propeller shaft. A resilient mount is connected solely to the engine block and adapted to be supported by a kingpin.

U.S. Pat. No. 5,192,235, which issued to Dunham et al on Mar. 9, 1993, describes an outboard motor vibration isolation system including an improved rubber mount. A marine propulsion device comprises a propulsion unit including a wall defining a cavity, and a rubber mount which is located in the cavity and which includes an annular outer shell. The shell has an outer surface engaging the wall and an inner surface defining an axially extending bore having a minimum diameter, and it is adapted to be connected to a kingpin. It also includes an end core portion having a diameter less than the minimum diameter and an opposite end core portion having a diameter greater than the minimum diameter and a resilient member extending between the outer shell surface and the inner core.

U.S. Pat. No. 5,443,406, which issued to Mondek et al on Aug. 22, 1995, describes a vibration isolating mounting for an outboard motor. A marine propulsion device comprises a propulsion unit assembly having forwardly located laterally spaced portions respectively including laterally aligned outwardly opening sockets and laterally aligned horizontally extending apertures communicating with the sockets. A kingpin assembly includes a portion located between the laterally extending portions and including a laterally extending bore aligned with the apertures and rubber mount assemblies respectively engaged in the sockets and having respective bores in alignment with the bore in the kingpin assembly. It also includes a laterally extending bolt projecting through the bores and through the apertures in spaced relation thereto and including a head engaging one of the rubber mount assemblies and a nut threaded on the bolt and engaging the other of the rubber mount assemblies.

U.S. Pat. No. 5,460,552, which issued to Blanchard et al on Oct. 24, 1995, describes an adapter plate mounting system for a marine jet propulsion unit. A mounting system for connecting a marine power head having a vertically disposed crankshaft to a jet propulsion unit is disclosed. Its purpose is for isolating operational vibrations including an adapter plate, a power head mounting apparatus on the adapter plate for securing the power head to the plate, and a connecting assembly for connecting the adapter plate to the jet propulsion unit at at least one point. The connecting assembly includes resilient portion to isolate vibrations generated by the power head.

U.S. Pat. No. 5,511,997, which issued to Yoshida on Apr. 30, 1996, describes a mounting arrangement for an outboard motor. The improved mounting arrangement for an outboard motor on the transom of an associated watercraft embodies elastic mounts comprised of an inner tube, an outer tube, and an interposed elastic member. The inner tube defines a cavity that receives the elastic member that is non-circular in cross section so as to permit a greater volume of damping material in a given spatial relationship.

U.S. Pat. No. 5,846,106, which issued to Kumita on Dec. 8, 1998, describes an outboard motor mounting arrangement for an outboard motor which has a body that is connected to a watercraft mounting bracket by at least one mount. The mount includes a resilient isolating member having a spring constant in a direction parallel to an axis extending from the front to the rear of the motor which is greater than its spring constant in direction parallel to a second line extending transverse to the first line. So arranged, the frequency of the excitation force applied to the isolating member over normal engine operating speeds does not correspond to the natural frequency of the isolating member in either direction and the resonant modes are avoided.

U.S. Pat. No. 6,146,220, which issued to Alby et al on Nov. 14, 2000, discloses a pedestal mount for an outboard motor. The outboard motor is mounted to a transom of a boat with the pedestal which is attached either directly to the transom or to an intermediate plate that is, in turn, attached to the transom. A motor support platform is attached to the outboard motor, and a steering mechanism is attached to both the pedestal and the motor support platform. The tilting mechanism is attached to the motor support platform and to the outboard motor. The outboard motor is rotatable about a tilting axis relative to both the pedestal and the motor support platform. The tilting mechanism is rotatable relative to the pedestal and about a steering axis. The steering axis generally vertical and stationary relative to the pedestal and is unaffected by the tilting of the outboard motor. The tilting mechanism is rotatable relative to the pedestal and about the steering axis with the outboard motor.

The patents described above are hereby expressly incorporated by reference in the description of the present invention.

Those skilled in the art of outboard motor design are well aware that it has long been a goal to provide an outboard motor that runs more silently and with less vibration than preceding outboard motor designs. When an outboard motor is operating, each of its combustion chambers experiences sequential firings of the fuel/air mixture within the cylinders and each firing, initiated by a sparkplug, creates an impulse force against a piston that can be transmitted to the engine system, its support structure, and the marine vessel to which the outboard motor is attached. These impulses result in noise and vibration experienced by the operator of the marine vessel.

A properly structural support system for the outboard motor is also critically important because of its relationship to the steering stability of the marine vessel. If the support system is too "soft", or compliant, steering instability can result in a dangerous condition which can significantly decrease the safe maneuverability and handling of the marine vessel. If the support system of the outboard motor is too "rigid", or stiff, vibration and noise emanating from the engine system are easily transmitted through the support structure to the marine vessel and the comfort of the marine vessel operator can be adversely affected.

It would therefore be significantly beneficial if a support system for an outboard motor could be developed in which vibration and noise were effectively isolated from the marine vessel while maintaining stability in the steering and handling of the marine vessel.

SUMMARY OF THE INVENTION

An outboard motor made in accordance with the preferred embodiment of the present invention comprises an engine system and a driveshaft connected in torque transmitting relation with an output shaft of the engine system. Throughout the description of the present invention, the term "engine system" will be used to include an engine block, cylinder head, and other components attached rigidly to the engine. The engine system is attached to a drive shaft housing and a gearcase.

Three or more connectors are attached to the engine system proximate three engine connection locations. A support structure, or support saddle, is attached to the three connectors proximate three support structure connection locations, with the three connectors defining a plane which is within forty five degrees from being perfectly perpendicular to the driveshaft. In a particularly preferred embodiment of the present invention, the plane defined by the connectors is approximately 20 degrees from perfect perpendicularity with the driveshaft. However, this angle can be different in other embodiments. Ideally, perfect perpendicularity is desirable, but an angle of 20 degrees illustrates that deviations from perfect perpendicularity are clearly within the scope of the present invention. Throughout the description of the present invention, the relationship between the plane of the three connectors and the driveshaft of the outboard motor will be described as being "generally perpendicular", but it should be clearly understood that a precise perpendicularity between the plane of the connectors and the central axis of the driveshaft is not a requirement. Empirical testing has shown that a range of angles from precise perpendicularity between the plane and the driveshaft are also acceptable to achieve the primary function of the present invention. A particularly preferred embodiment has a connector plane that is twenty degrees from perfect perpendicularity.

In a particularly preferred embodiment of the present invention, the support structure surrounds the engine system in the plane of the three connectors. It should be understood that although the present invention can be implemented using three connectors, a preferred embodiment of the present invention uses four connectors. The torsional resonance of the engine systems supported by the three connectors is less than or equal to 70.7% of the firing frequency of the combustion chambers of the engine system in a particularly preferred embodiment and within 65%–75% in most embodiments. Of course, it should be understood that different criteria could be used in other applications and those criteria could depend on whether the associated engine is a two cycle or four cycle engine.

A driveshaft housing is suspended from the engine system with the driveshaft being disposed at least partially with the driveshaft housing. A gear housing is attached to a lower portion of the driveshaft housing.

Each of the three connectors comprises a central shaft disposed in generally concentric relation with an outer metal tube, with the central shaft being connected to the outer metal tube by an elastomeric material. In one particularly preferred embodiment of the present invention, the three connectors define a plane which is within approximately twenty degrees from being perpendicular to the driveshaft. The support structure of the present invention is rotatably attached to a transom bracket for rotation about a generally vertically steering axis. In one embodiment of the present invention, the support structure is also rotatably attached to the transom bracket for rotation about a generally horizontal tilt or trim axis, but this rotatability is not always necessary. The driveshaft housing and the gear housing are solely supported by the support structure.

In a particularly preferred embodiment of the present invention, a center of gravity of the engine system is located aft of at least one of the three connectors, forward of at least one of the connectors, on a starboard side of at least one of the three connectors, and on a port side of at least one of the three connectors.

BRIEF DESCRIPTION OF THE DRAWINGS

The present invention will be more fully and completely understood from a reading of the description of the preferred embodiment, in conjunction with the drawings, in which:

FIGS. 1 and 2 are schematic representations of the prior art;

DESCRIPTION OF THE PREFERRED EMBODIMENT

Figure 4:
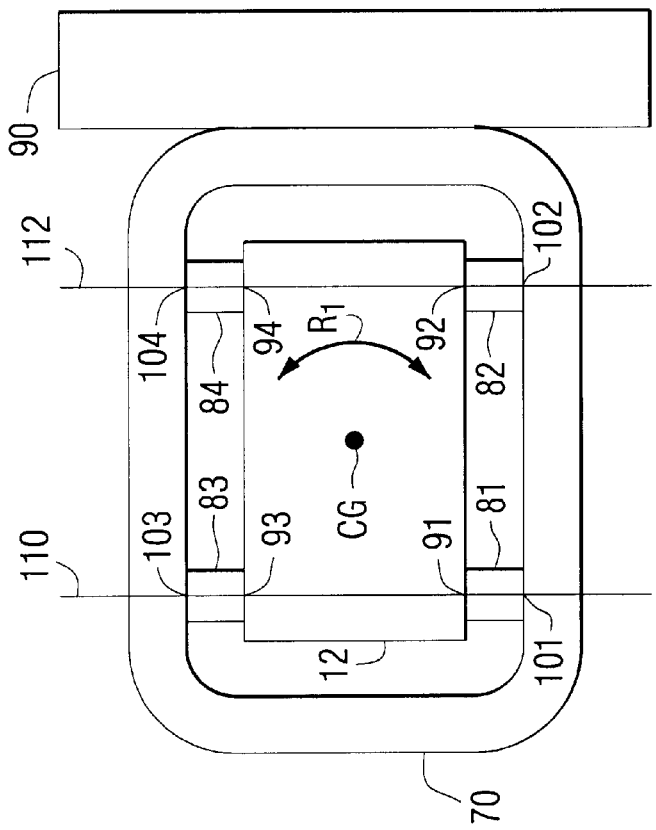
FIGS. 3 and 4 are schematic representations of the present invention.

Throughout the description of the preferred embodiment of the present invention, like components will be identified by like reference numerals.

In order to fully understand the advantages of the present invention, it is necessary to understand how outboard motors are supported in systems known in the prior art. FIG. 1 is a highly simplified schematic representation of an outboard motor 10 comprising an engine 12 that is rigidly attached to an adapter plate 14 and supported by a transom bracket 16. A driveshaft housing 18 is supported from the adapter plate 14 and a gear housing 20, or gear case, is supported from the driveshaft housing 18. Two support arms, identified by reference numerals 31 and 32, are represented by dashed lines in FIG. 1 and provide the connection between the outboard motor 10 and the transom bracket 16. In U.S. Pat. No. 5,964,197, which is described above, these arms are identified by reference numerals 19 and 19a and are referred to as upper and lower connecting members. In U.S. Pat. No. 6,146,220, described above, this function is partially performed by the components identified by reference numerals 90 and 92 and referred to as the lower yoke assembly and the upper yoke assembly. Depending on the particular design configuration of the outboard motor 10, the upper and lower support arms, 31 and 32, can be configured in various shapes and sizes, but their basic function is to provide a connection between the outboard motor 10 and a support mechanism such as the transom bracket 16 which is schematically represented in FIG. 1.

With continued reference to FIG. 1, an upper mount 41 and a lower mount 51 are illustrated as connecting the upper and lower support arms, 31 and 32, to the outboard motor 10. As is well known to those skilled in the art, the mounts typically incorporate an elastomeric material to isolate engine vibration from the mounting structure, such as the transom plate 16.

FIG. 2 is a top view of FIG. 1. Since the port and starboard support arms are vertically aligned in this example, the support arms are identified by both reference numerals, 31 and 32, in FIG. 2. Similarly, the upper and lower supports, 41 and 51, are aligned vertically and identified as shown in FIG. 2. In FIGS. 1 and 2, it should be understood that four mounts are used in association with four support arms to support the outboard motor 10.

With reference to FIGS. 1 and 2, it should be understood that the support arms, 31 and 32, and the mounts, 41 and 51, are subjected to numerous forces and moments during operation of the outboard motor 10. For example, the rotation of the propeller attached to the gear housing 20 creates a propulsion force P represented by the arrow in FIG. 1 and the firing of fuel/air mixtures in the combustion chambers of the engine 12 creates moments about the center of gravity CG which result in a rotational oscillation represented by arrow R in FIG. 2. It should be understood that many other moments and force vectors can exist during the operation of the outboard motor and transfer vibrations through the support structural members, 31 and 32, to the transom plate 16 and to the marine vessel to which the transom plate 16 is attached. The forces and moments to which an outboard motor is subjected can be generally classified as six rigid body modes, which can include forces in the forward-reverse, port-starboard, and upward-downward directions, along with moments about each of those three linear axes. These six rigid body modes can isolate forces and moments. They control the amount of low and mid range engine speed operation. Other moments and forces are controlled by certain engine parameters (e.g. number of cylinders, bore, stroke, whether the engine is a two or four cycle). The elastomeric components of the mounts, 41 and 51, serve to partially isolate the vibrations of the engine 12 from the marine vessel, but the dynamics of movement of the outboard motor 10 can be complex such that translational and rotational movements are highly interrelated. As a result, a support structure such as that shown in FIGS. 1 and 2, which is generally known to those skilled in the art, can only be partially effective in isolating the vibrations of the outboard motor 10 from the marine vessel to which the transom plate 16 is attached.

Figure 3:
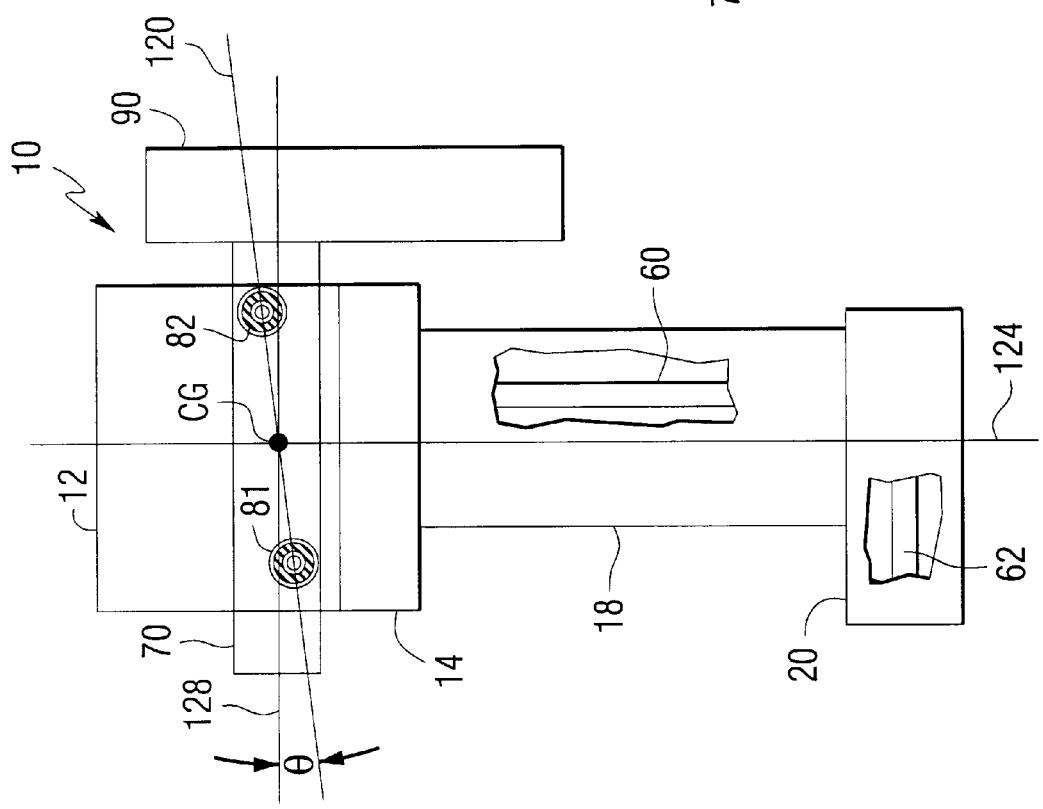

FIG. 3 is a highly schematic side view of an outboard motor 10 supported according to the concepts of the present invention. As described above in conjunction with FIG. 1, an engine 12 is rigidly attached to an adapter plate 14 and a driveshaft housing 18 is suspended from the adapter plate 14, with a gear housing 20, or gear case, suspended from the driveshaft housing 18. In the description of the present invention, the engine 12, which comprises an engine block and cylinder head along with other associated components, and the adapter plate 14 is considered to be an unitary engine system. In addition, as is well known to those skilled in the art, a driveshaft 60 is attached in torque transmitting relation with a crankshaft (not shown) of the engine 12. The driveshaft 60 is shown in a partial cutaway portion of the driveshaft housing 18 and a propeller shaft 62 is shown in a partial cutaway portion of the gear housing 20. A support structure 70 surrounds the engine system and is connected to the engine system by a plurality of connectors such as those identified by reference numerals 81 and 82 on the starboard side of the engine system in FIG. 3. It should be understood that the use of the term "engine system" in the description of the preferred embodiment of the present invention can comprise an engine block and cylinder head or, alternatively, can further comprise the adapter plate 14 and associated components.

FIG. 4 is a top view of the arrangement described above in conjunction with FIG. 3. It should be understood that both FIGS. 3 and 4 are highly simplified schematic representations of the present invention provided for the purpose of describing the basic concepts of the present invention. More detailed representations of the components of the present invention will be described below.

In FIG. 4, four connectors, 81–84, are shown. Each of the connectors, 81–84, is attached to the engine 12 at an associated engine connection location, 91–94, respectively. In addition, each of the connectors, 81–84, are attached to the support structure 70 at support structure connection locations, 101–104, respectively. In a particularly preferred embodiment of the present invention, which will be described in greater detail below, a central portion of each connector is rigidly attached to the engine system and an outer portion of each connector is rigidly attached to the support structure 70. However, it should be clearly understood that the opposite configuration is also within the scope of the present invention. The support structure 70 is attached to a support member 90 which can be constructed generally similarly to the transom bracket 16, described above in conjunction with FIGS. 1 and 2, or configured similarly to that described in U.S. Pat. No. 6,146,220. The exact shape and size of the support member 90, which is attachable to a transom of a boat, is not limiting to the present invention.

With reference to FIGS. 3 and 4, it should be understood that connectors 81 and 83, in this particular embodiment, are generally aligned with each other along an axis 110 and connectors 82 and 84 are generally aligned with each other along an axis 112. The alignment of these connectors, as described above, is not a necessity in all embodiments of the present invention. The connectors, 81–84, define a plane represented by dashed line 120 in FIG. 3. All of the connectors, 81–84, or alternatively their engine connection locations, 91–94, or alternatively their support structure connection locations, 101–104, define the plane 120. As can be seen in FIG. 3, the plane 120 is generally perpendicular to a line 124 which is parallel to the driveshaft 60. In FIG. 3, line 124 is shown extending through the center of gravity CG, but it should be understood that the driveshaft 60 typically does not extend precisely through the center of gravity CG. For purposes of this discussion, dashed line 124 need only be parallel to the driveshaft 60. Dashed line 128 represents a plane that is perfectly perpendicular to the driveshaft 60. As can be seen, the plane 120 which is defined by the connectors, 81–84, is not perfectly perpendicular to the driveshaft 60. Instead, it varies from being precisely perpendicular with the driveshaft 60 by an angle identified as Θ. Because of numerous design considerations, certain applications of the present invention may not be suitable for achieving perfect perpendicularity between plane 120 and the driveshaft 60. It has been empirically determined that the beneficial results of the present invention can be achieved satisfactorily as long as angle Θ is less than or equal to forty-five degrees and preferably less than twenty-five degrees. Of course, it should be understood that this angle can be in either direction with respect to perfect perpendicularity with the drive shaft. In other words, either the forward or rearward connectors can be lower than the plane of perfect perpendicularity.

With reference to FIGS. 1–4, it should be understood that the connectors, 41, 51, and 81–84, in the prior art and in the present invention are typically provided with an elastomeric material for the purpose of isolating the two rigid portions of the connectors. Although the particular structure of the connectors used in a preferred embodiment of the present invention will be described in greater detail below, it is important to understand that each of the connectors used in the prior art and in the present invention provide a certain spring constant resulting from the use of the elastomeric material. As a result, engine 12 and its means for support are not rigidly attached to each other. A rigid attachment between the engine and the transom bracket, for example, would result in direct transference of vibration from the engine to the marine vessel. To avoid this, a certain degree of isolation is provided by the elastomeric material used in the connectors. However, it should also be understood that even though the connectors provide a certain degree of vibration isolation because of the existence of the elastomeric material within their structure, applications of these of types of connectors in the prior art have not efficiently isolated the vibration of the engine from being transferred to the marine vessel to which the engine is attached. As will be described in greater detail below in conjunction with FIGS. 5–8, the connectors are configured to exhibit different degrees of resilience in different directions. These varying spring constants in different directions are achieved through the configuration and shape of the elastomeric material disposed between the central portion of the connectors which is attached to the engine system and the outer portions of the connectors which are attached to the support structure 70. More specifically, as will be described in greater detail below, the elastomeric material is provided with certain solid portions connecting the inner and outer structures of the connectors in certain regions of the elastomeric interface and by providing certain air gap portions at other regions of the elastomeric interface. This air gap provides a variable spring rate that changes as the air gap closes. This air gap provides a "soft" spring rate at low engine speeds and then, as the air gap closes, it provides an increased stiffness as thrust is applied to the engine system so that steering stability is enhanced.

With reference to FIGS. 1 and 3, it can be seen that the present invention places at least three of its connectors, 81–84, in a common plane 120 that is generally perpendicular to the driveshaft 60. The prior art, on the other hand, places its connectors, 41 and 51, in a plane that is generally parallel to dashed line 124 which, in turn, is parallel to the driveshaft within the driveshaft housing 18. In addition, with reference to FIGS. 2 and 4, it can be seen that the present invention places its connectors, 81–84, at locations around the periphery of the engine system. As a result, the engine connection locations, 91–94, are located at a greater distance in the port and starboard connections from the center of gravity CG in comparison to these relationships in the prior art as shown in FIG. 2. Furthermore, with reference to FIGS. 2 and 4, it can be seen that the present invention provides connectors that are located significantly forward of and behind the center of gravity CG in comparison to the locations described above in conjunction with FIG. 2. With reference to FIG. 4, it can be seen that connectors 82 and 84 are forward of the center of gravity CG, connectors 81 and 83 are aft of the center of gravity CG, connectors 83 and 84 are on a port side of the center of gravity CG, and connectors 81 and 82 are on a starboard side of the center of gravity CG.

Figure 5:
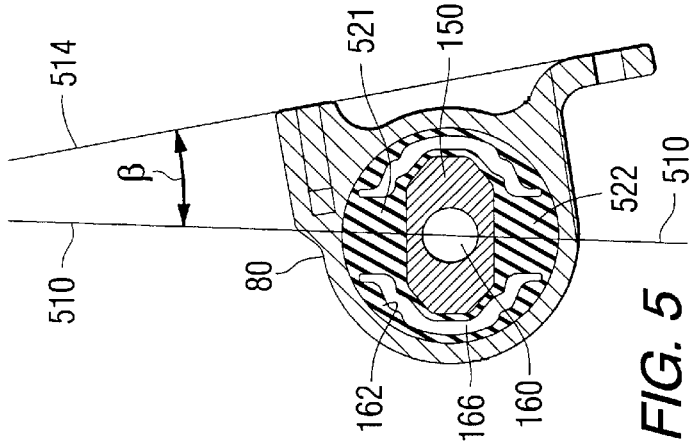

FIGS. 5–8 show various views of a connector 80 that is suitable for use in conjunction with the outboard motor of the present invention. FIG. 5 is a section view of the connector 80, illustrating its central shaft 150 which is disposed in generally concentric relation with an outer metal tube 154. As can be seen, the central shaft 150 is provided with a central hole 160 through which a bolt or stud can be inserted, as will be described in greater detail below. The central shaft 150 is connected to the outer metal tube 154 by an elastomeric material 162. As can be seen in FIG. 5, an air gap 166 is provided within the structure of the elastomeric material 162 to facilitate relative movement between the central shaft 150 and the outer metal tube 154. A portion of the elastomeric material 162 is shaped to form elastomeric supports, 521 and 522, which are aligned to directly connect the central shaft 150 with the outer metal tube 154. The remaining circumferential portions of the elastomeric material 162 provide air gaps 166 that allows a softer, or more resilient, support between the central shaft 150 and the outer metal tube 154 than in the direction along line 510. The shape and size of the air gap 166 controls the non-linear stiffness characteristics of the device. This, in turn, controls points at which additional energy can potentially pass through the mount structure. Dashed line 514 in FIG. 5 represents the plane of the support structure 70 against which the connector is attached. In FIG. 5, it can be seen that lines 510 and 514 are not parallel with each other. Instead, they converge at an angle P. The angle between lines 510 and 514 allow the connector to be rigidly attached to the support structure while maintaining a preferred alignment of line 510, or the elastomeric support members 521 and 522. These relationships will be described in greater detail below. It is important to understand that the engine can be attached to either connector 80 or the central shaft 150, with the other of these two components connected to the support structure 70.

Figure 6:
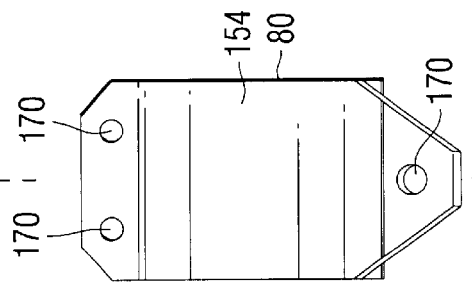

FIG. 6 shows the outer metal tube 154 of the connector 80 along with mounting holes 170 which allows the connector 80 to be attached to the support structure 70 of the present invention, as will be described in greater detail below. As can be seen, FIG. 5 is a section view of FIG. 6.

Figure 7:
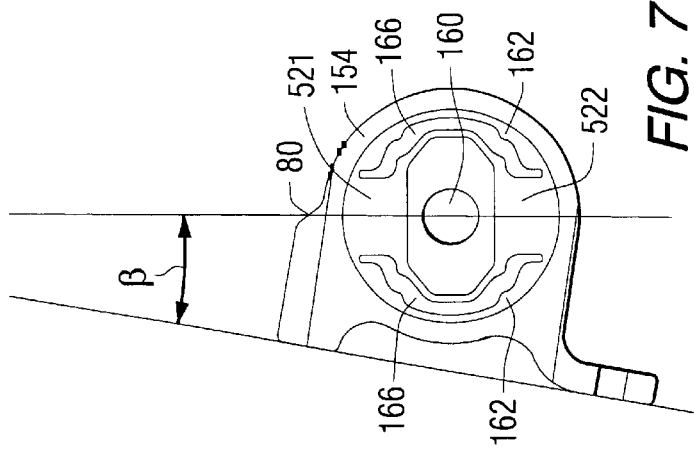
FIGS. 5–8 show various views of a connector used with the present invention.
Figure 8:
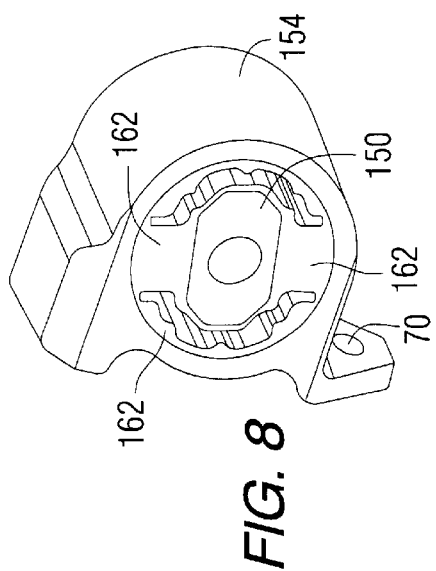

FIG. 7 is an end view of the connector 80 showing the central shaft 150 disposed concentrically with the outer metal tube 154. The outer surface of the central shaft 150 is not circular in FIGS. 5 and 7, but certain embodiments of the connector 80 can incorporate a generally circular central shaft 150 with a cylindrical opening 160 extending through it. FIG. 7 also shows the air gap 166 provided within the structure of the elastomeric material 162. FIG. 8 is an isometric of a connector 80 that is suitable for use with the present invention.

Figure 9:
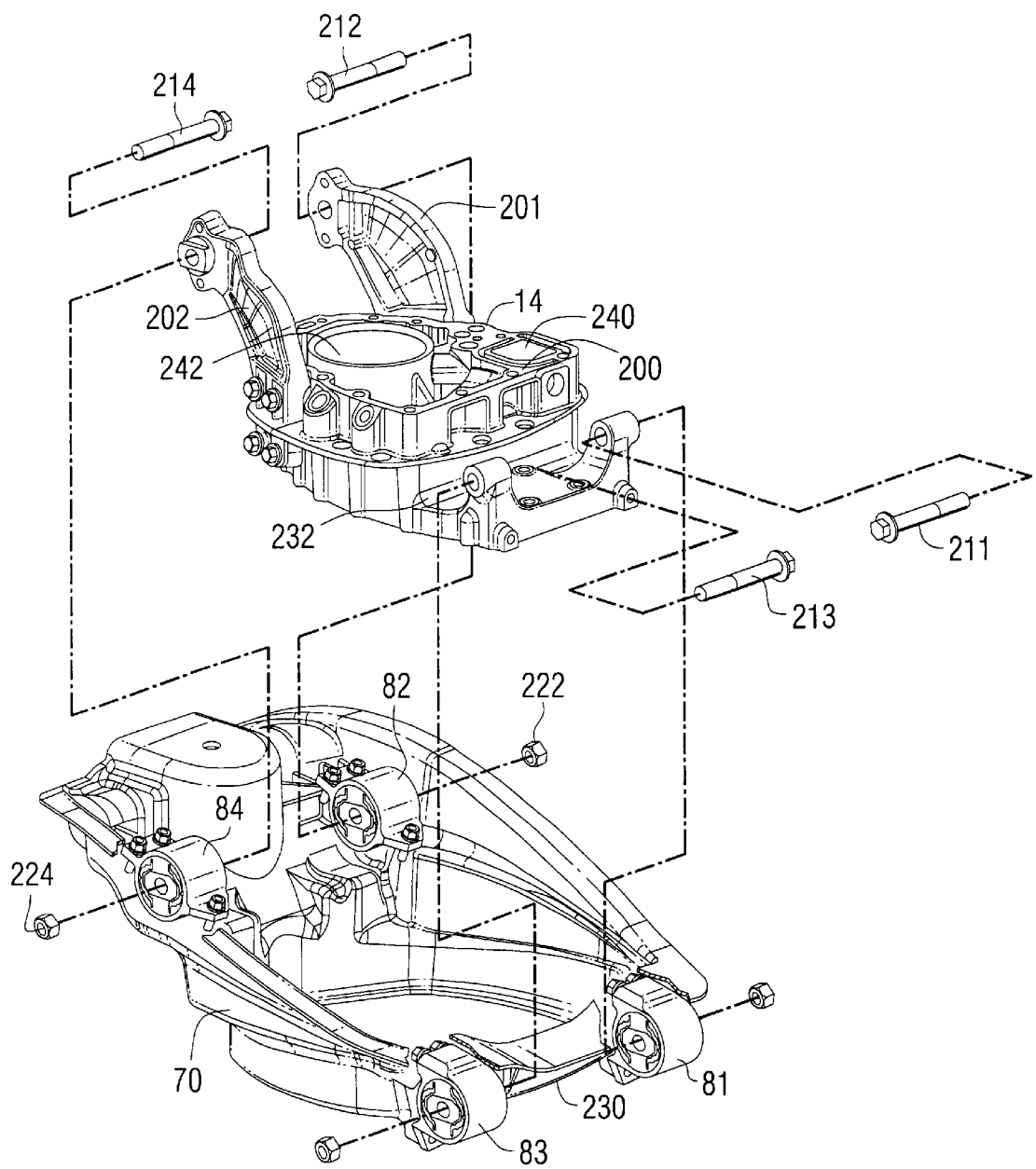
FIG. 9 is an exploded isometric view of a support structure and adapter plate of the present invention.

FIG. 9 is an isometric exploded view of a preferred embodiment of the present invention. The support structure 70, or support saddle, is shaped to receive an adapter plate 14 of an engine system. Although not specifically shown in FIG. 9, it should be understood that the adapter plate 14 is shaped to receive an engine rigidly attached to its upper surface 200. Two support arms, 201 and 202, are rigidly attached to the adapter plate 14 and both support arms are connected to the central shaft 150 of associated connectors, 82 and 84. Pin 214 connects support arm 202 to connector 84 by being disposed within the central opening 160 of the central shaft 150 of connector 84 and held in place by a nut 224. Similarly, bolt 212 extends through support arm 201 and through the central shaft of connector 82. It is held in place by nut 222.

Resonances of the support structure 70 and the support arms will control the amount of energy transmitted into the transom of the marine vessel. These resonances should be placed at magnitudes which are not common with normal operating speeds of the engine. The best magnitude would be at an operating speed of the engine where the marine vessel is operating in a water displacement mode below planing speeds.

In a particularly preferred embodiment of the present invention, a front portion of the adapter plate 14 is provided with holes that are shaped to receive bolts 213 and 211 which extend through the central opening 160 of the central shaft 150 of connectors 83 and 81, respectively. A front edge 230 of the support structure 70 is received in a gap 232 of the adapter plate 14. The four connectors, 81–84, are bolted to the support structure 70 as shown in FIG. 9. The only supporting connection between the engine system and the support structure 70 is through the connectors, 81–84.

In FIG. 9, an exhaust passage 240 and an opening 242 to receive an oil pump are also shown. An engine block, with an attached cylinder head, is attachable to the upper surface 200 of the adapter plate 14 and a driveshaft housing 18 is attached to the lower portion of the adapter plate 14. The four connection points provided by the connectors, 81–84, support the entire structure of the engine, the drive housing 18, the gear housing 20, and all of the associated components attached to them.

Figure 10:
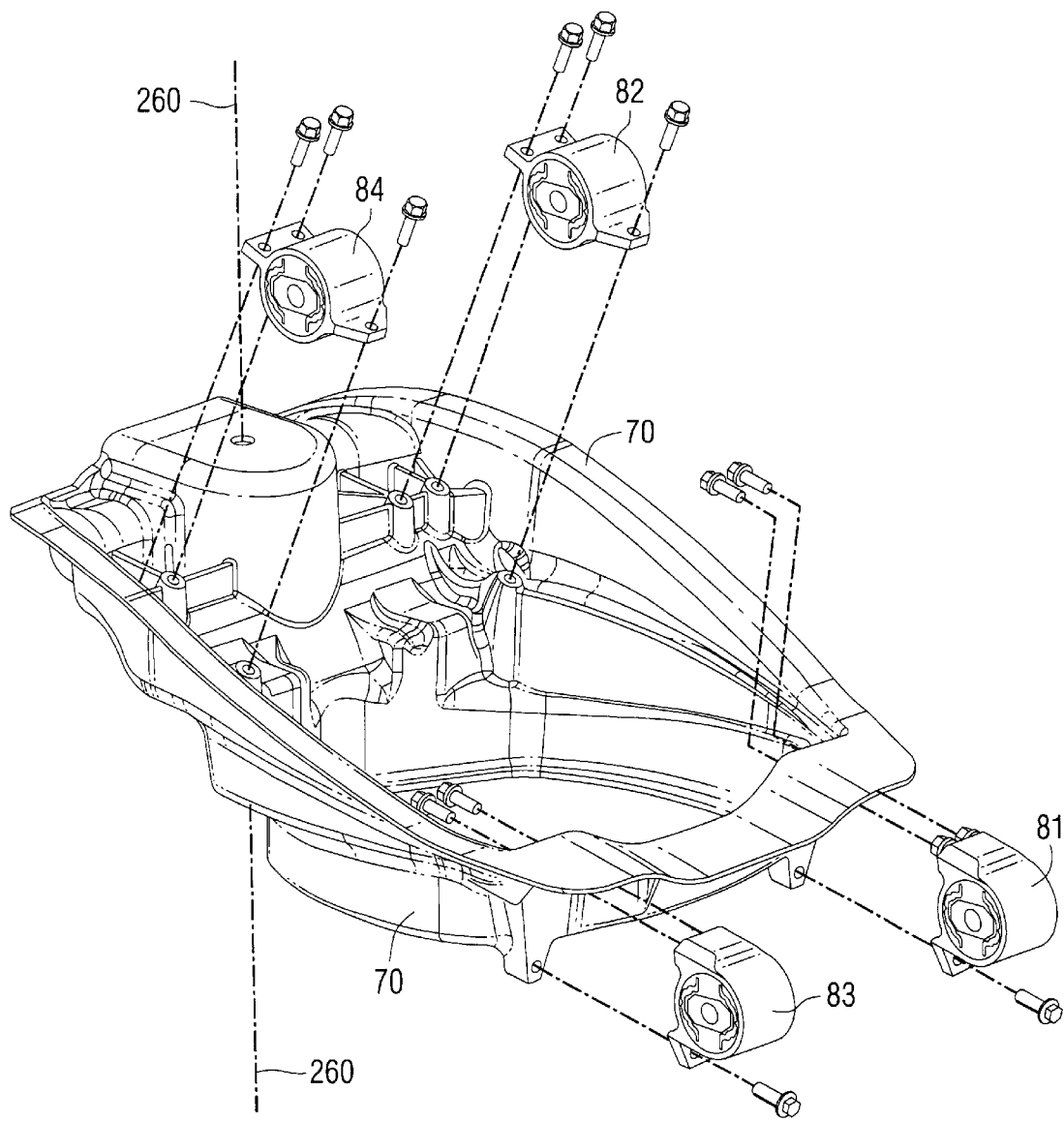
FIG. 10 shows a support structure of the present invention in an isometric exploded view in association with four connectors.

FIG. 10 is an isometric exploded view of a support structure 70 with its four connectors, 81–84. Also shown in FIG. 10 are the assorted bolts used to rigidly attach the outer metal tubes of the connectors, 81–84, to the support structure.

A generally vertical steering axis 260 is shown with respect to the support structure 70. The support structure 70, along with its attached engine system, driveshaft housing, and attached components, pivot about the steering axis 260 when the operator of the marine vessel steers the vessel. Although not illustrated in FIG. 10, it should be understood that the adapter plate 14 is shaped to be received in the central cavity of the support structure 70 as described above in conjunction with FIG. 9.

Figure 11:
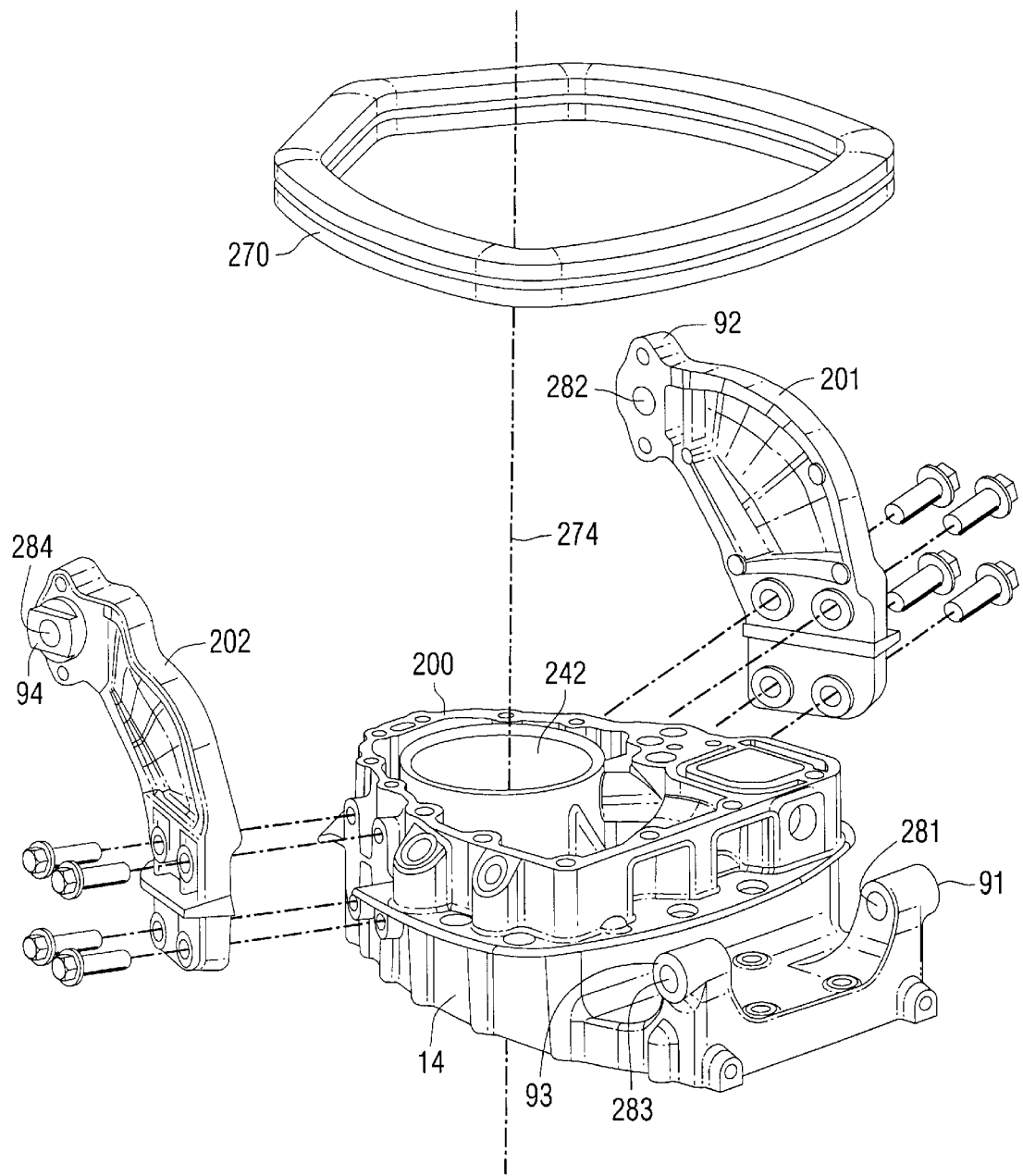
FIG. 11 is an isometric exploded view of an adapter plate and two support arms along with a seal.

FIG. 11 is an exploded isometric view of the adapter plate 14 and the two support arms, 201 and 202, which are rigidly attached to it. FIG. 11 also shows a seal 270 that is used to provide a seal between the adapter plate 14 and an engine block that is rigidly attached to its upper surface 200. As described above, in conjunction with FIG. 9, cavity 242 is shaped to receive an oil pump. The driveshaft 60 of the outboard motor extends vertically through an opening formed in the bottom of cavity 242. Dashed line 274 represents the axis of rotation of the driveshaft of the outboard motor.

When the components illustrated in FIG. 11 are assembled, it can be seen that holes 282 and 284, through the upper portions of support arms 201 and 202, respectively, are at a higher position than holes 281 and 283. Since holes 281–284 are shaped to receive bolts, 211–214, for the purpose of attaching connectors, 81–84, to the engine system, the two aft connectors, 81 and 83, will be at a lower position than the two forward connectors, 82 and 84. This characteristic was described above in conjunction with FIG. 3. As a result, the plane 120 that extends through the four bolts, 211–214, is not perfectly perpendicular to the axis 274 of the driveshaft 60. In fact, the plane described by holes 281–284, is approximately 20 degrees from perfect perpendicularity with the driveshaft. Also shown in FIG. 11 are the engine connection locations, 91–94, described above in conjunction with FIG. 4.

Figure 12:
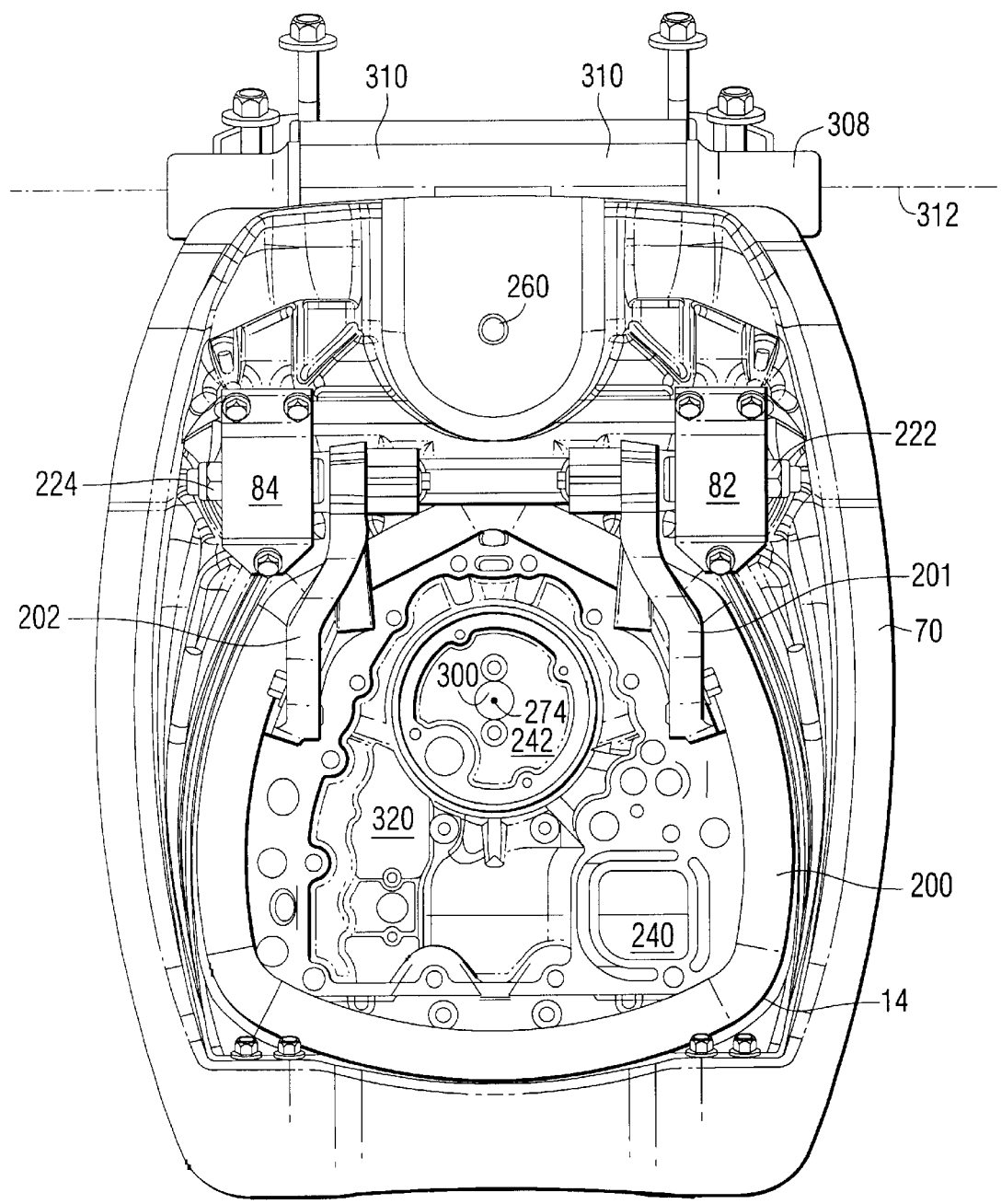
FIG. 12 is a top view of a support structure of the present invention attached to an adapter plate.

FIG. 12 is a top view of the support structure 70 and the adapter plate 14 which is attached to the adapter plate through four connectors, 81–84. Only the two forward connectors, 82 and 84, are visible in FIG. 12. In FIG. 12 the upper surface 200 of the adapter plate 14 is visible along with the cavity 242 in which an oil pump is disposed. The driveshaft axis 274 extends in a vertical direction through an opening 300 in the bottom of cavity 242. The steering axis 260 is also shown. At the forward portion of the support structure 70, a hydraulic cylinder 308 used for steering is shown along with a tilt tube 310 that will be described in greater detail below in conjunction with FIG. 13. A tilt axis 312 extends horizontally through the tilt tube 310.

With continued reference to FIG. 12, it can be seen that the four connectors, 81–84, are spread apart more in the port and starboard directions, relative to the center of gravity, than in outboard motors known to those skilled in the art. In addition, it can be seen that the four connectors, 81–84, are also disposed in a common plane that is generally perpendicular to the axis 274 of the driveshaft 60. The exhaust passage 240 and a cooling water return passage 320 are also visible in FIG. 12.

Figure 13:
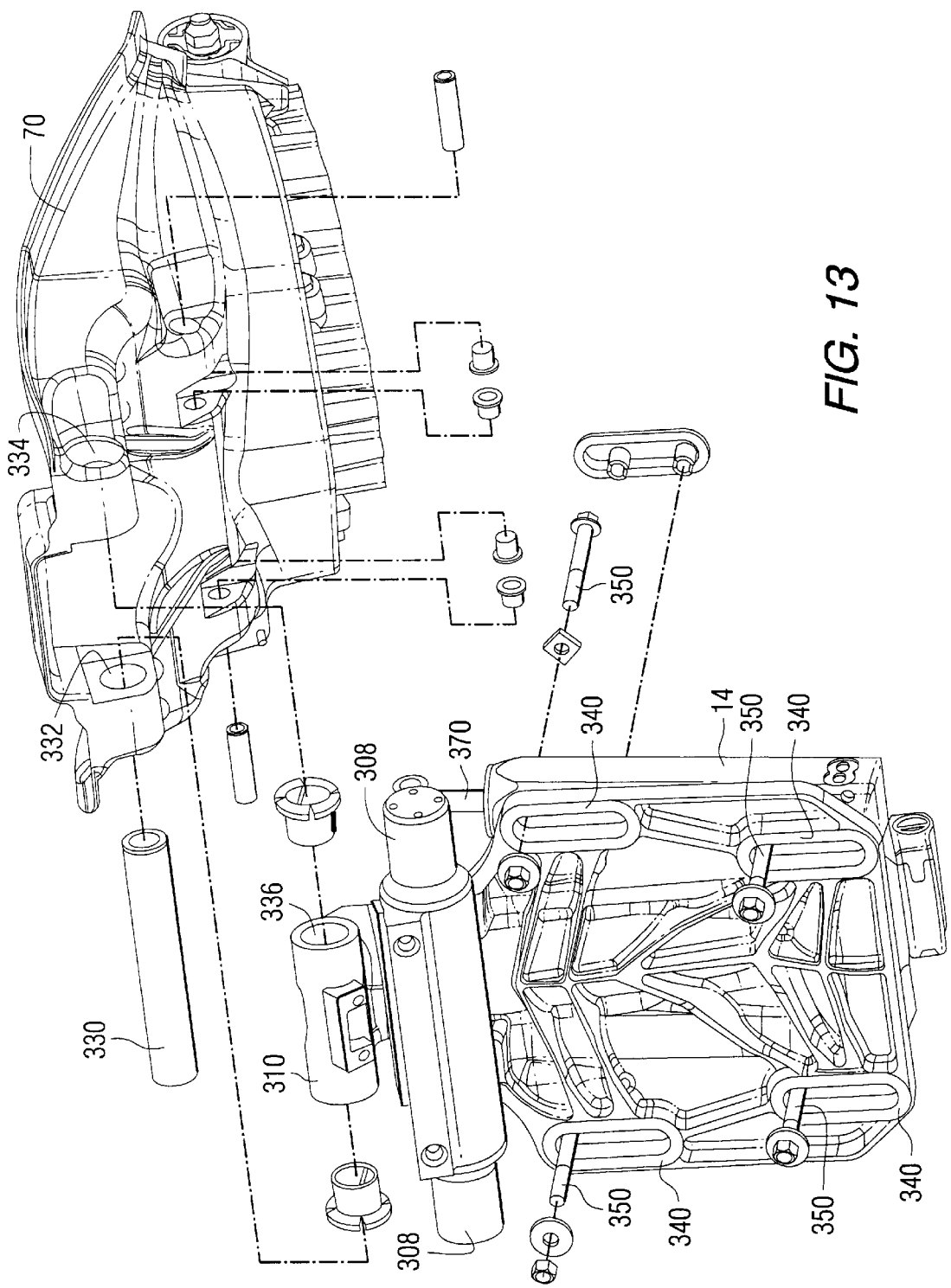
FIG. 13 is an exploded view of the support structure of the present invention associated with a transom bracket.

FIG. 13 is an exploded isometric view of the support structure 70 shown in relation to a transom bracket 14. The transom bracket 14 is provided with the hydraulic cylinder 308 that operates a steering yoke (not shown) to cause the support structure 70 to rotate about its steering axis 260, which is described above in conjunction with FIGS. 10 and 12. A tilt tube 330 is inserted into cylindrical openings 332 and 334 and through the central opening 336 of the tubular structure 310 which is attached to the transom bracket 14. It should be understood that the view of FIG. 13 is facing rearwardly from a marine vessel and that surfaces 340 are intended to be placed in contact with the rearward surface of a transom of a marine vessel. Bolts 350 are used to attach the transom bracket 14 to the transom of a marine vessel. Cylindrical holes 360 are provided through portions of the support structure 70 to allow the support structure 70 to be attached to trim cylinders 370 which exert a force on the support structure 70 to cause it to rotate about the central axis of tilt tube 330. Since the engine system, driveshaft housing, and gear housing, are all supported by the support structure 70, tilting the support structure about the centerline of tilt tube 330 will cause the entire outboard motor structure to tilt with it.

Figure 14:
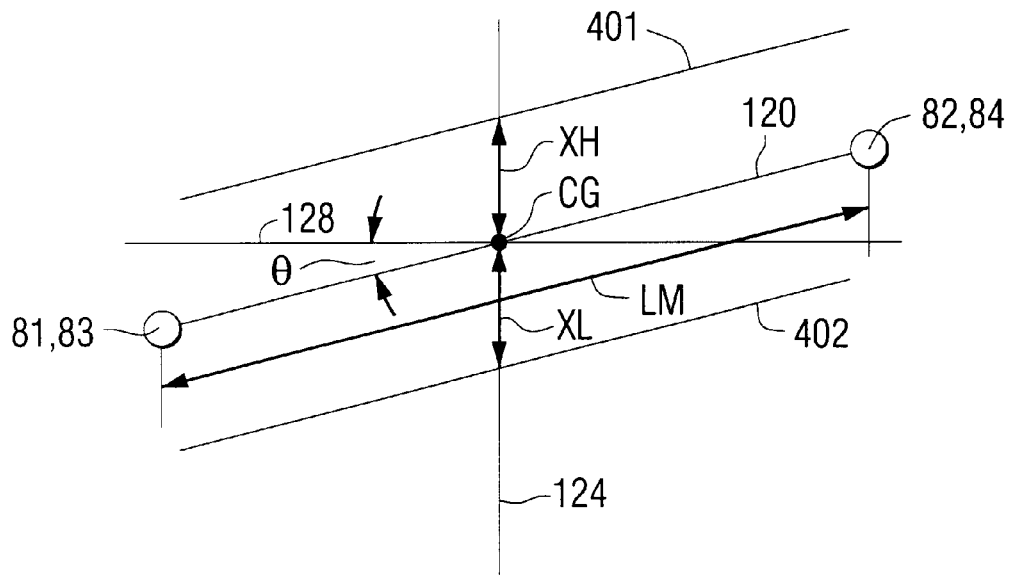
FIG. 14 is a graphical representation of several dimensions of the present invention.

FIG. 14 is a highly simplified diagram showing some of the dimensions and positional relationships between the connectors, 81–84, and some of the other lines and planes described above in conjunction with FIG. 3. It should be understood that one preferred embodiment of the present invention would place the connectors, 81–84, in a common plane which is perpendicular to dashed line 124 which, in turn, is parallel to the central axis of the driveshaft 60. This would place plane 120 coincident with plane 128 in FIG. 14. However, it is recognized that perfect perpendicularity between plane 120 and the driveshaft 60 is not always possible. The four connectors, 81–84, must also conform to other design requirements and to the spatial limitations created by the shapes and sizes of the engine system and the support structure 70. As a result, certain embodiments of the present invention place the plane 120 of the connectors, 81–84, at an angle Θ to a plane 128 that is perfectly perpendicular to the driveshaft as represented by dashed line 124. Dimensional arrow LM represents the distance between the mounts measured in a generally forward and aft direction along plane 120.

In a preferred embodiment of the present invention, the center of gravity CG is located within the plane 120 defined by the connectors, 81–84. However, it is recognized that the precise positioning of the center of gravity CG within the plane 120 is not always possible. It has been determined that a variation in the position of the center of gravity CG relative to the plane 120, does not adversely affect the beneficial characteristics of the present invention if the center of gravity CG is within a certain distance of plane 120, measured in a vertical direction along dashed line 124. Dimensional arrows XH and XL represent the allowable deviation in vertical position between the center of gravity CG and the plane 120 defined by the connectors, 81–84. Dashed lines 401 and 402 represent a range of positions of the center of gravity CG relative to plane 120 that are acceptable for proper performance of the present invention. Although the dimensions of XH and XL have not been tested empirically through a complete range of possibilities, it has been determined that the present invention operates most beneficially if the magnitude of either XH or XL is less than or equal to approximately plus or minus 35% of the magnitude of length LM.

With continued reference to FIG. 14, it should be understood that plane 120, which is defined by the connectors, within a preferred embodiment of the present invention is generally perpendicular to dashed line 124 which is parallel to the driveshaft 60. As described above, perfect perpendicularity is not required. The basic concepts of the present invention can be implemented as long as the angle Θ between plane 120 and plane 128 is less than 45 degrees. In other words, as long as plane 120, defined by the position of the connectors, is more perpendicular to line 124 than it is parallel to line 124, the structure of the support system is within the scope of the present invention.

Figure 15:
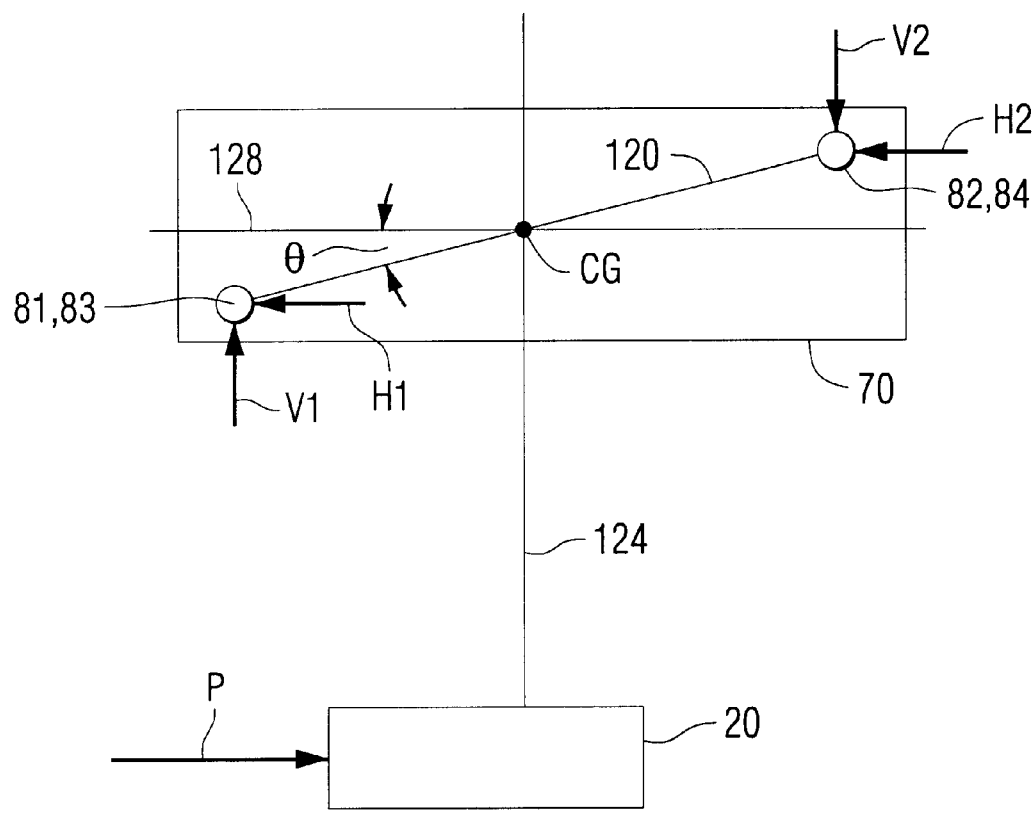
FIG. 15 shows a diagram of several forces that can act on various locations in a preferred embodiment of the present invention.

FIG. 15 is a simplified schematic representation of the connectors, 81–84, the gear case 20, the center of gravity CG, and certain planes and lines described above in conjunction with FIG. 3. As described above, the total weight of the outboard motor is supported by the support structure 70. This support is provided through four connections, 81–84, which are connected to both the engine system and the support structure 70. The driveshaft housing and gear case 20 are rigidly attached to the engine system, and particularly the adapter plate, and are also supported solely by the support structure 70.

With continued reference to FIG. 15, it should be understood that the outboard motor can experience six rigid body modes of movement, or vibration. These six rigid body modes comprise three linear movements along forward-aft, port-starboard, and upward-downward axes. In addition, these six rigid body modes comprise rotational movement about each of those three linear axes. Virtually all engines also exhibit internal forces and moments that are caused by their rotating crankshafts, reciprocating pistons, and rods that are rotating and translating. These forces are often oriented in directions which are not entirely consistent with the primary torque direction of the engine. As an example, certain preferred embodiments of the present invention have been developed for in-line four and six cylinder four cycle engines. In the four cylinder application, the engine fires twice during every revolution of the crank shaft. As a result, torque pulses are generated about the engine's vertical axis. This creates a mode about the crank shaft which must be addressed. This type of engine also has a fore/aft internal force created by the reciprocating pistons, as is the case in all four cylinder in-line engines. In order to isolate these forces, one must also be concerned with the fore/aft and rotational modes about the port/starboard axis of the boat. In an in-line six cylinder, four cycle application, the engine is virtually perfectly balanced and does not exhibit significant internal forces. As a result, the primary concern is the related to the vertical axis as opposed to the other modes. A significant advantage of the present invention is that it provides a way to isolate the vibrations of both of these engine types with the same basic design. It is recognized that two cycle engines may require the mounts of the present invention to be rearranged within the plane.

Since FIG. 15 is a planar representation, only certain force vectors can be illustrated. However, the force vectors shown in FIG. 15 illustrate how the outboard motor is supported solely by the four connectors, 81–84, which are all located in a common plane 120. Force vector P represents the propulsion force exerted on the gear case 20 by a propeller and, as a result, on the outboard motor. This propulsion thrust P creates a moment about the center of gravity CG and also creates a forward force on the support structure 70 through the connectors, 81–84. The force vectors shown in FIG. 15 relative to the connectors, 81–84, represent the reactions exerted by the support structure 70 on the connectors. Horizontal forces, such as H1 and H2 only balance the horizontal portion of the propulsion force P. It should be understood that when the marine vessel is accelerating, the horizontal forces, H1 and H2, do not totally balance the magnitude of the propulsion force P. The propulsion force P also creates a counterclockwise moment about the center of gravity CG which is balanced by the sum of the moments resulting from the two horizontal forces, H1 and H2, and the two vertical forces, V1 and V2. It can be seen in FIG. 15 that no reaction forces to the propulsion vector P are exerted on the outboard motor other than those vectors acting on the connectors, 81–84, which are located in plane 120.

Figure 16:
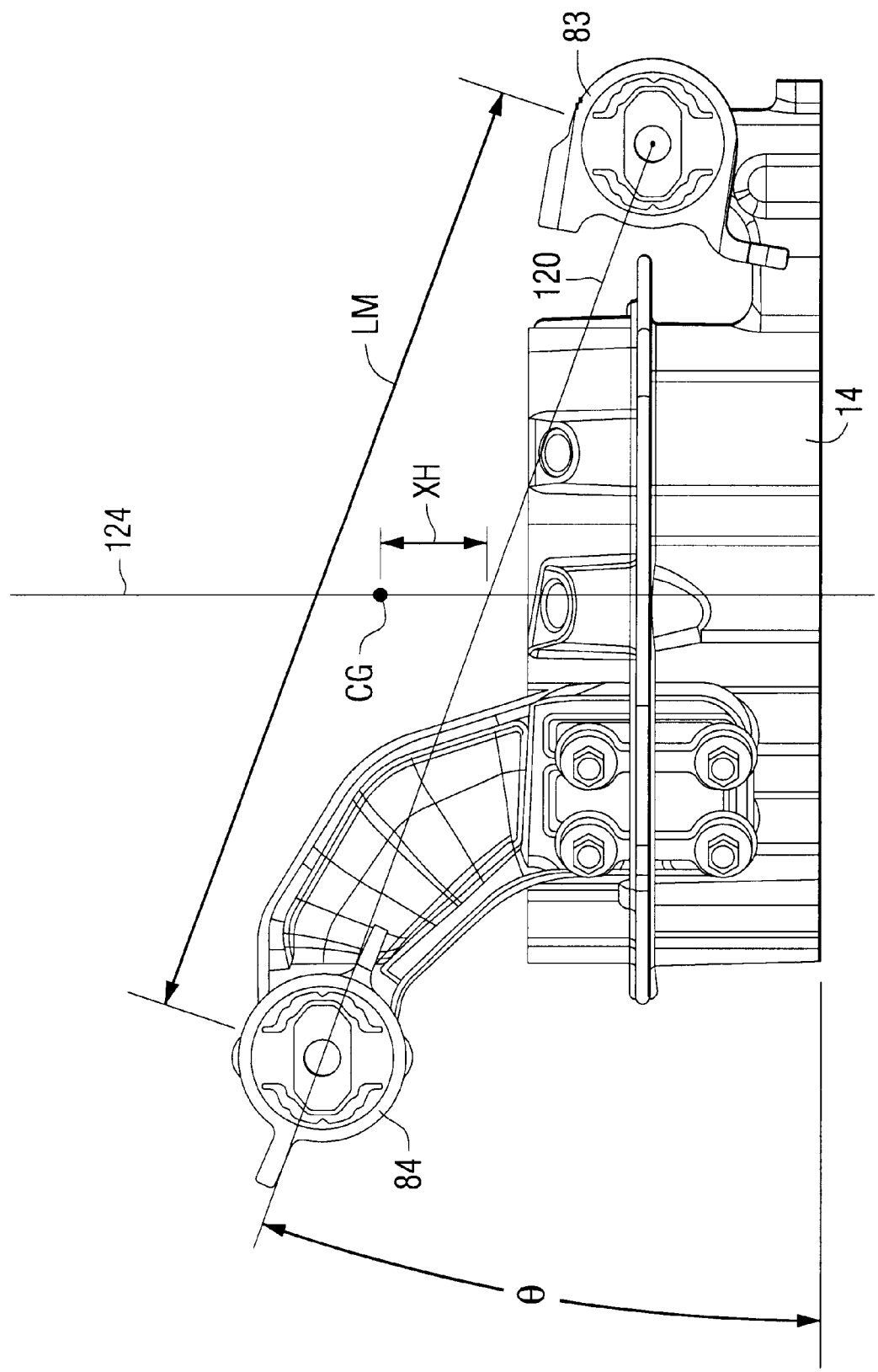
FIG. 16 shows an adapter plate with several relevant dimensions regarding the center of gravity.

FIG. 16 shows a side view, from a port side of the outboard motor, of the adapter plate 14. Dimension LM, between the centers of connectors 83 and 84, and dimension XH, between plane 120 and the center of gravity CG, are also identified. In certain actual embodiments of the present invention, different engines can be used in association with the same adapter plate 14. These different engine blocks, along with their different cylinders heads and associated components, result in slightly different locations of the center of gravity CG with respect to the plane 120 defined by the connectors, 81–84. Although the precise dimensions are not limiting to the scope of the present invention, these different engine systems resulted in the location of the center of gravity CG being approximately 5.6", 4.1", 2.3", 0.8", and −0.7" from the plane 120, in a vertical direction parallel to the drive shaft and measured along line 124. The four largest magnitudes described above are above plane 120 (i.e. dimension XH in FIGS. 14 and 16) and the smallest magnitude is negative which indicates that it is below plane 120 (i.e. dimension XL in FIG. 14). In view of the fact that dimension LM, in one embodiment of the present invention, is approximately 18.5", the range of distances (i.e. XH and XL in FIG. 14) of the center of gravity CG in a vertical dimension along line 124 from the plane 120 is less than approximately 31%. Although this percentage could be greater in alternative embodiments of the present invention, preferred embodiments are within this range. In the embodiment of the adapter plate 14 shown in FIG. 16, the angle Θ is approximately 19.8 degrees.

One of the primary goals of the present invention is to decouple the various rigid body natural vibration modes from each other. Most importantly, a goal of the present invention is to decouple the rotational mode about the crankshaft axis. This is accomplished by providing all of the support connectors, 81–84, in a common plane 120 which is generally perpendicular to the driveshaft 124 or, alternatively stated, generally parallel to a horizontal plane 128. While it is preferable to have the plane 120 of the connectors, 81–84, include the center of gravity CG within it, this preciseness is not required in all embodiments of the present invention. Similarly, while certain embodiments of the present invention could result in a plane 120 of the connectors, 81–84, being perfectly perpendicular to the driveshaft line 124, this is not necessary in all embodiments and a certain magnitude of angle Θ in FIGS. 14 and 15 is also within the scope of the present invention. It should also be understood that dashed line 124 has been referred to in direct relation to the driveshaft 60, but dashed line 124 need not be the central axis of rotation of driveshaft 60 according to the concepts of the present invention. Dashed line 124 is parallel to the central axis of rotation of driveshaft 60 and extends through the center of gravity CG of the outboard motor. In certain embodiments, the axis of rotation of the driveshaft 60 may actually pass through the center of gravity CG and, as a result, the axis of rotation of the driveshaft 60 could be coincident with dashed line 124, but this is not expected to occur in most embodiments of the present invention.

With reference to FIGS. 5 and 9, it should be noted that the internal structure of the connectors, 81–84, have a preferred position relative to the outer metal tube 154. In FIG. 9, all of the elastomeric material portions 162 of the connectors are arranged to provide the stiffest axis of the connector in a vertical arrangement. In FIG. 5, line 510 passes through the portions of the elastomeric material 162 that provide all of the support for the central shaft 150 and its cylindrical opening 160. An upper elastomeric support 521 and a lower elastomeric support 522 represent the only direct and continuous connection between the outer metal tube 154 and the central shaft 150. In a preferred embodiment of the present invention, as illustrated in FIG. 9, these two elastomeric supports, 521 and 522, are arranged in a vertical alignment to provide the stiffest axis of support of the connectors, 81–84, in a vertical direction. It should also be understood that the air gap 166 allows movement of the central shaft 150 in a direction non parallel to line 510 when the engine system is subjected to forces such as those described above in conjunction with FIG. 15. When subjected to these forces, the central shaft 150 and its attached elastomeric material, can move in directions non parallel to line 510. When this occurs, the air gap 166 changes shape and, in certain circumstances, is decreased to zero. The elastomeric material directly surrounding the central shaft 150 can then move into direct contact with the elastomeric material on the opposite side of one of the air gaps 166. This relationship allows the connector to exhibit dual spring constants which provide a significant benefit because a softer spring constant can be available during low speed operation (e.g. at idle speed) of the engine system to more significantly isolate vibration from being transmitted through the support structure 70 to the marine vessel. When higher forces are exerted on the engine system at higher engine speeds, the elastomeric material 162 can be distorted to close one of the air gaps 166 and provide a stiffer transfer of force from the central shaft 150 to the outer metal tube 154. Although FIG. 9 shows all of the connectors, 81–84, with their elastomeric supports, 521 and 522, arranged in a vertical alignment, it should be understood that deviations from a vertical alignment can be used advantageously when needed to provide the stiffest support in other axes.

It is also important to understand that the relative positions of the elastic supports, 521 and 522, relative to the housing structure of the connector 80 define the direction of line 510. The association of the lines 510 of all of the connectors, in turn, define the elastic center of the structure. It is beneficial to focus lines 510 of the connectors 80 on an elastic center which serves to maximize the effectiveness of the vibration damping system.

With reference to FIG. 9, it can be seen that the two forward connectors, 82 and 84, are not perfectly identical to the two rear connectors, 81 and 83. Because of the manner in which the outer metal tubes are attached by bolts to the support structure 70, the relative positions of the elastomeric material within the outer metal tubes changes to conform to this connection requirement while maintaining the generally vertical alignment of the two elastomeric supports, 521 and 522, within each connector, 81–84.

In each of the six rigid body modes described above, the resonance of the engine system is intended to be less than or equal to 70.7% of the forcing function exerted on the connectors. For example, the torsional resonance of the engine system about a vertical axis through the center of gravity CG is less than or equal to 70.7% of the firing frequency of the combustion chambers of the engine system in a preferred embodiment of the present invention. This same theory applies to two and four stroke engine forcing functions.

By incorporating the concepts of the present invention, as described above, the forces exerted by the engine system and on the engine system can be isolated from the support structure 70. This also prevents vibration and noise from being transmitted to a marine vessel to which the support structure is attached.

Throughout the description of the preferred embodiment of the present invention, it has been emphasized that the four connections, 81–84, are strategically placed to surround the center of gravity CG of the engine system. It is not always necessary that the connectors, 81–84, be placed outside of the outer surfaces of the engine itself. In fact, with reference to FIG. 12, it can be seen that portions of the outer surface of the engine which is attached to the upper surface 200 of the adapter plate 14 would extend in both a port and starboard direction beyond lines connecting connectors 81 and 82 and connecting connectors 83 and 84. It should also be clearly understood that, although four connectors have been used to describe the preferred embodiment of the present invention, alternative embodiments can utilize three connectors. For example, a pair of connectors shown in FIG. 10 can possibly be replaced by single connector in alternative embodiments. As an example, a single connector could possibly be designed which replaces the pair of connectors, 81 and 83. Alternatively, an embodiment of the present invention could possibly use a single connector to perform the function of connectors 81 and 84.

The important characteristic of the present invention is that the isolation system provided by the connectors be symmetrical about the center of gravity CG, as viewed in a vertical direction. With respect to the plane defined by the connectors, the connectors are disposed symmetrically around the center of gravity when both the spring constants and physical locations of the connectors are considered. If all the connectors have identical spring constants, this symmetry can be achieved geometrically by spacing the opposing connectors at equal distances about the center of gravity CG. Alternatively, if connectors with differing spring constants are used, dimensional compensation can be achieved by changing the distances between the center of gravity and the various connectors. Regardless of the particular technique used, and with consideration given to both the dimensional positioning of the connectors and their respective spring constants, the support system of connectors should exhibit general symmetry about the center of gravity.

With reference to FIG. 4, rotational oscillation about the center of gravity CG is identified by arrow R. This rotational oscillation is caused by the sequential firing of the combustion chambers of the engine 12. In a four cycle internal combustion engine, each combustion chamber experiences a combustion event every other cycle. In a four cylinder four cycle engine, this results in two combustion events per revolution. At an idle speed of approximately 600 RPM, or 10 HZ, the engine would therefore provide combustion events at a rate of 20 HZ. Similarly, a six cylinder four cycle engine would produce three combustion events per revolution, or 30 combustion events per second at an idle speed of 600 RPM. The amount of vibration transferred to the support structure 70, as a result of these combustion events, depends on the torsional resonance of the support system, including the connectors, 81–84. In selecting the positions of the connectors, 81–84, and their respective spring rates, it is important that the torsional resonance about the vertical axis through the center of gravity CG be less than or equal to approximately 70% of the forcing function, or the firing frequency, of the engine. More specifically, the torsional frequency about the vertical axis through the center of gravity should be approximately 70.7% of the firing frequency which is the rate of combustion events within the engine. Although it is possibly acceptable to have a torsional resonance of the support structure that is in the range of 65%–75% of this firing frequency, a torsional resonance less than 70% of the firing frequency is highly preferred as long as steering stability is appropriately considered in this determination. Calculation of the torsional resonance of a four point support system, as a function of the positions of the connectors and of their respective spring rates, is a highly complex calculation and is dependent upon the specific magnitudes of the parameters of a particular design. Computer programs are available to perform these calculations and those skilled in the art are aware of many alternative computer programs that are suitable for this function. Regardless of the method of calculating the torsional resonance of the support system, or determining this value empirically, it is important that the connectors be positioned at locations that, in reference to their respective spring rates result in a torsional resonance for the entire system that is equal to or less than 75% of the firing frequency of the engine and preferably less than 70.7% of that forcing function. It should also be understood that for two cycle engines, the firing frequency as a result of the idle speed will be twice the magnitude than the equivalent firing frequency for a four cylinder engine.

The improved noise control of the present invention is also enhanced by the fact that the cowl of the outboard motor is not connected directly to the engine. An aesthetic benefit is realized because any movement of the engine is concealed by this relationship. In addition, shifting sounds are reduced by the use the multiple rate mounting arrangement of the present invention.

Although the present invention has been described in particular detail and illustrated to show a specific embodiment, it should be understood that alternative embodiments are also within its scope.

We claim:

1. An outboard motor, comprising:

an engine system;

a drive shaft connected in torque transmitting relation with an output shaft of said engine system;

three connectors attached to said engine system proximate three engine connection locations; and a support structure attached to said three connectors proximate three support structure connection locations, said three connectors defining a plane which is within 45 degrees from being perpendicular to said drive shaft, each of said three connectors comprising a central shaft disposed in generally concentric relation with an outer metal tube, said central shaft being connected to said outer metal tube by an elastomeric material.

2. The outboard motor of claim 1, wherein:

said central shaft of each of said three connectors is attached to said engine system and said outer metal tube of each of said three connectors is attached to said support structure.

3. An outboard motor, comprising:

an engine system;

a drive shaft connected in torque transmitting relation with an output shaft of said engine system;

three connectors attached to said engine system proximate three engine connection locations; and a support structure attached to said three connectors proximate three support structure connection locations, said three connectors defining a plane which is within 45 degrees from being perpendicular to said drive shaft, the torsional resonance of said engine system supported by said three connectors being less than or equal to 70.7% of the firing frequency of the combustion chambers of said engine system.

4. The outboard motor of claim 3, wherein:

said support structure surrounds said engine system in said plane.

5. The outboard motor of claim 3, further comprising:

a drive shaft housing suspended from said engine system, said drive shaft being disposed at least partially within said drive shaft housing; and a gear housing attached to a lower portion of said drive shaft housing, said engine system comprising an engine block, a cylinder head, and an adapter plate.

6. The outboard motor of claim 3 wherein:

said three connectors define a plane which is within 21 degrees from being perpendicular to said drive shaft.

7. The outboard motor of claim 3, wherein:
said support structure is rotatably attached to a transom bracket for rotation about a generally vertical steering axis.

8. The outboard motor of claim 3, wherein:
four connectors are attached to said engine system proximate four engine connection locations, said support structure being attached to said four connectors proximate four support structure connection locations, said four connectors defining a plane which is generally perpendicular to said drive shaft.

9. The outboard motor of claim 5, wherein:
said drive shaft housing and said gear housing are solely supported by said support structure.

10. The outboard motor of claim 3, wherein:
said support structure is rotatably attached to a transom bracket for rotation about a generally horizontal tilt axis.

11. The outboard motor of claim 3, wherein:
a center of gravity of said engine system is located aft of at least one of said three connectors, said engine system being located forward of at least one of said three connectors, said center of gravity of said engine system being located on a starboard side of at least one of said three connectors, said engine system being located on a port side of at least one of said three connectors.

12. The outboard motor of claim 8, wherein:
a center of gravity of said engine system is located aft of two of said three is connectors, said engine system being located forward of two of said three connectors, said center of gravity of said engine system being located on a starboard side of two of said three connectors, said engine system being located on a port side of two of said three connectors.

13. An outboard motor, comprising:
an engine system;
a drive shaft connected in torque transmitting relation with an output shaft of said engine system;
four connectors attached to said engine system proximate four engine connection locations; and
a support structure attached to said three connectors proximate three support structure connection locations, said three connectors defining a plane which is within 45 degrees from being perpendicular to said drive shaft, said support structure being attached to said four connectors proximate four support structure connection locations, said four connectors defining a plane which is generally perpendicular to said drive shaft, a center of gravity of said engine system being located aft of two of said three connectors, said engine system being located forward of two of said three connectors, said center of gravity of said engine system being located on a starboard side of two of said three connectors, said engine system being located on a port side of two of said three connectors.

14. An outboard motor, comprising:
an engine system;
a drive shaft connected in torque transmitting relation with an output shaft of said engine system;
four connectors attached to said engine system proximate four engine connection locations; and
a support cradle attached to said four connectors proximate four support cradle connection locations, said four connectors defining a plane which is generally perpendicular to said drive shaft, said support cradle surrounding said engine system in said plane.

15. The outboard motor of claim 14, further comprising:
a drive shaft housing suspended from said engine system, said drive shaft being disposed at least partially within said drive shaft housing; and
a gear housing attached to a lower portion of said drive shaft housing, said engine system comprising an engine block, a cylinder head, and an adapter plate.

16. The outboard motor of claim 15, wherein:
each of said four connectors comprises a central shaft disposed in generally concentric relation with an outer metal tube, said central shaft being connected to said outer metal tube by an elastomeric material, said central shaft being rigidly attached to said engine system and said outer metal tube being rigidly attached to said support cradle.

17. The outboard motor of claim 16, wherein:
said central shaft of each of said four connectors is attached to said engine system and said outer metal tube of each of said four connectors is attached to said support structure.

18. The outboard motor of claim 17, wherein:
said support cradle is rotatably attached to a transom bracket for rotation about a generally vertical steering axis and rotatably attached to said transom bracket for rotation about a generally horizontal tilt axis.

19. The outboard motor of claim 14, wherein:
the torsional resonance of said engine system supported by said four connectors is less than or equal to 70.7% of the firing frequency of the combustion chambers of said engine system.

20. An outboard motor, comprising:
an engine system;
an output shaft connected in torque transmitting relation with said engine system;
at least three connectors attached to said engine system proximate at least three engine connection locations; and
a support cradle attached to said at least three connectors proximate at least three support cradle connection locations, said at least three connectors defining a plane which is generally perpendicular to said output shaft, said support cradle surrounding said engine system in said plane.

21. The outboard motor of claim 20, further comprising:
a output shaft housing suspended from said engine system, said output shaft being disposed at least partially within said output shaft housing; and
a gear housing attached to a lower portion of said output shaft housing, said engine system comprising an engine block, a cylinder head, and an adapter plate.

22. The outboard motor of claim 21, wherein:
each of said at least three connectors comprises a central shaft disposed in generally concentric relation with an outer metal tube, said central shaft being connected to said outer metal tube by an elastomeric material, said central shaft being rigidly attached to said engine system and said outer metal tube being rigidly attached to said support cradle.

23. The outboard motor of claim 20, wherein:
said support cradle is rotatably attached to a transom bracket for rotation about a generally vertical steering axis and rotatably attached to said transom bracket for rotation about a generally horizontal tilt axis, said output shaft housing and said gear housing being solely supported by said support cradle, the torsional resonance of said engine system supported by said at least three connectors is within a range of 65% to 75% of the firing frequency of the combustion chambers of said engine system.

24. The outboard motor of claim 20, wherein:

a center of gravity of said engine system is located aft of at least one of said at least three connectors, said engine system being located forward of at least one of said at least three connectors, said center of gravity of said engine system being located on a starboard side of at least one of said at least three connectors, said engine system being located on a port side of at least one of said at least three connectors.

25. The outboard motor of claim 20, wherein:

four connectors are attached to said engine system proximate four engine connection locations, said support structure being attached to said four connectors proximate four support structure connection locations, said four connectors defining a plane which is generally perpendicular to said drive shaft.

26. The outboard motor of claim 25, wherein:

a center of gravity of said engine system is located aft of two of said four connectors, said engine system being located forward of two of said four connectors, said center of gravity of said engine system being located on a starboard side of two of said four connectors, said engine system being located on a port side of two of said four connectors.

* * * * *